Nov. 28, 1967  L. M. FORBUSH  3,355,218

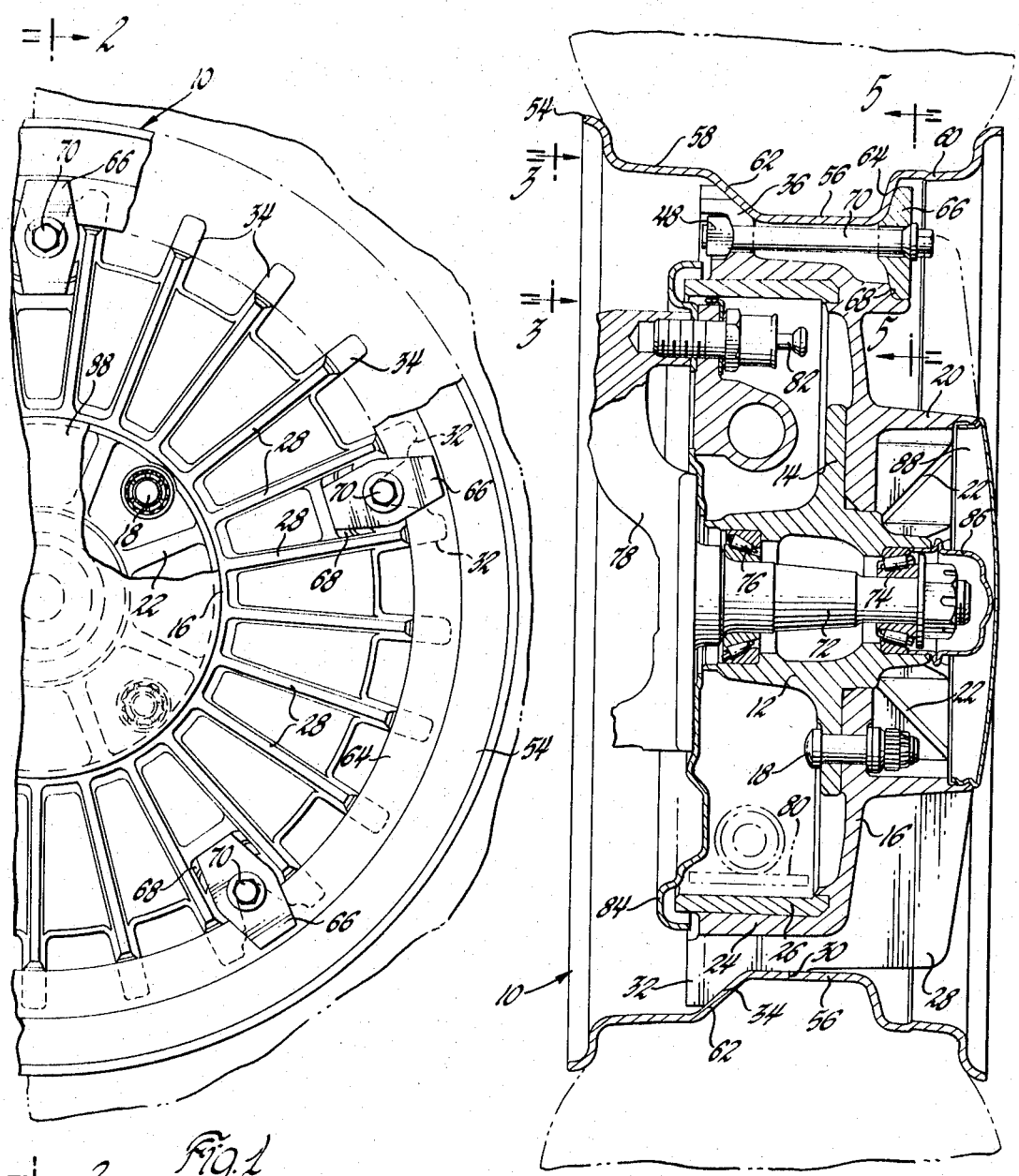

WHEEL ASSEMBLY

Filed Feb. 28, 1966

INVENTOR.
Lothrop M. Forbush
BY
*Robert Furman*
ATTORNEY 3,355,218
WHEEL ASSEMBLY
Lothrop M. Forbush, Birmingham, Mich., assignor to General Motors Corporation, Detroit, Mich., a corporation of Delaware
Filed Feb. 28, 1966, Ser. No. 530,667
1 Claim. (Cl. 301—6)

ABSTRACT OF THE DISCLOSURE

A wheel assembly includes a rim demountably attached to a spider which is mounted by bearings to a wheel spindle. The spider includes a brake lining and means for mounting brake shoes. The spider further includes a plurality of radially extending ribs, spaced pairs of which are joined by webs each including a slot and defining a cavity. The rim is seated on tapered rib surfaces and on lugs which are seated on the spider. Bolts engage the lugs and extend between the rim and spider through the slots into engagement with nuts adjustably mounted within the cavities.

---

This invention relates generally to motor vehicle wheel assemblies and more specifically to a wheel assembly having a rim demountably attached to a spider.

One feature of this invention is that the spider includes a plurality of radially extending strengthening ribs, spaced pairs of which are joined by integral web portions. Another feature is that the ribs have axial and ramp surfaces which seat the rim. Yet another feature is that lugs engage the rim and spider are connected to the webs by means clamping the rim to the spider. A further feature is that each web includes a slot which receives a lug-connected bolt and defines a cavity which retains a nut engaging the bolt. A yet further feature is that each lug cavity and nut have mating grooved surfaces for rockably positioning the nut to receive the bolt.

Yet further features of this invention will become readily apparent upon reference to the following detailed description of the attached drawings in which:

FIGURE 1 is a partially broken away elevational view of a wheel assembly according to this invention;

FIGURE 2 is a sectional view taken generally on the plane indicated by line 2—2 of FIGURE 1;

Figure 6:
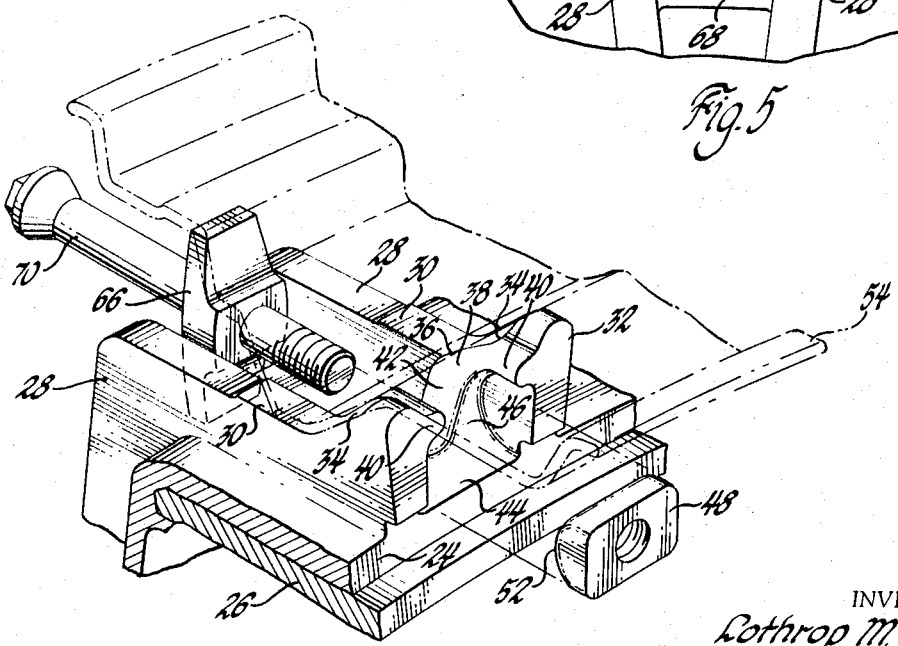
FIGURE 6 is an exploded perspective view.

Referring now to FIGURES 1 and 2 of the drawings, a wheel assembly 10 according to this invention includes an inner hub 12 having a radial flange 14. A spider 16 is mounted on flange 14 by a plurality of bolts 18. Both hub 12 and spider 16 are preferably formed of cast aluminum or magnesium. Spider 16 includes a central hub portion 20 supported by strengthening ribs 22 and an outer drum portion 24 having an integrally cast iron brake drum 26. Spider 16 includes a plurality of circumferentially spaced strengthening ribs 28 projecting radially from hub portion 20 and drum portion 24. As best shown in FIGURES 2 and 6, each rib 28 includes an axial surface 30 and a radially extending segment 32 providing a ramp surface 34.

Figure 3:
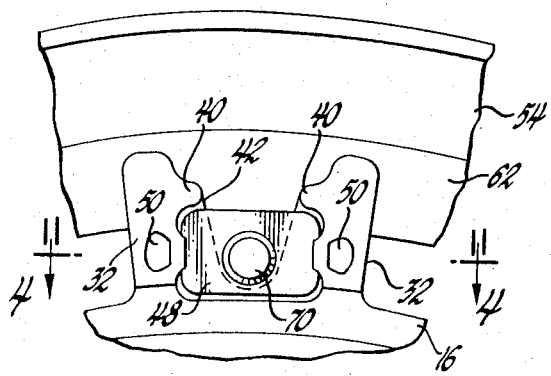
FIGURE 3 is an enlarged detail view taken generally on the plane indicated by line 3—3 of FIGURE 2.
Figure 4:
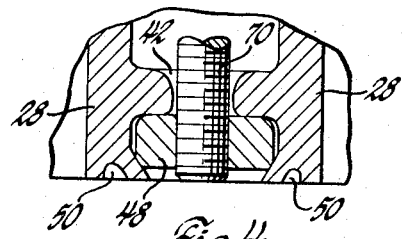
FIGURE 4 is a sectional view taken generally on the plane indicated by line 4—4 of FIGURE 3.
Figure 5:
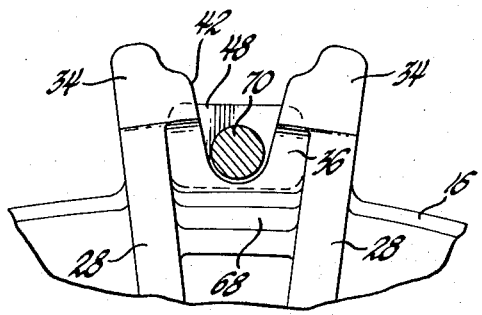
FIGURE 5 is a partially broken away enlarged detail view taken generally on the plane indicated by line 5—5 of FIGURE 2.

Referring now to FIGURES 5 and 6, spaced pairs of the ribs 28 are interconnected by an integral web portion 36 which includes a radial segment 38 and a pair of axial segments 40 defining a slot 42. These segments 38 and 40 define a generally rectangular cavity 44 having a curved surface 46. A nut 48 is received within cavity 44 by staking 50, FIGURES 3 and 4. Referring again to FIGURE 6, nut 48 has a curved surface 52 which matingly seats against surface 46 to permit rocking of nut 48 within cavity 44.

Referring again to FIGURES 1 and 2, a stamped sheet metal rim 54 is detachably mounted on spider 16 and includes a base flange 56 which is connected to intermediate flanges 58 and 60 by tapered flanges 62 and 64. Flange 56 seats against rib surface 30, while tapered flange 62 seats against the ramp surface 34. As shown in FIGURES 1, 2 and 5, a plurality of lugs 66 seat against notched surfaces 68 on spider 16 and against rim flange 64. Rim 54 is clamped to spider 16 by bolts 70 which interconnect lugs 66 and webs 36 by engaging nuts 48. The rockable mounting of each nut 48 within cavity 44 compensates for minor misalignment and ensures engagement with a bolt 70. Thus rim 54 is mounted on spider 16 by the seating of flanges 56 and 62 on surfaces 30 and 34 and the clamping action of lugs 66 against flange 64 to maintain rim 54 in alignment on spider 16.

As shown in FIGURE 2, hub 12 is connected to a wheel spindle 72 by a pair of conventional bearings 74 and 76. Spindle 72 is carried by a support member 78 which supports conventional brake shoes 80 (shown in phantom lines) on studs 82 inwardly of brake drum 26. Support 78 further carries a conventional brake drum dust cover 84. A bearing dust cap 86 is received within hub 12, while a decorative hub cap 88 is received within the hub 20.

The wheel assembly described enables the use of an inexpensive stamped metal rim with a light weight hub and spider formed of cast aluminum or magnesium and having an integrally cast iron brake drum.

While only a preferred embodiment of this invention is shown and described, other modifications are contemplated within the scope of this invention.

I claim:
A wheel assembly comprising,
 a rim having a base flange and spaced first and second annular flanges,
 a spider having a plurality of circumferentially spaced radially extending ribs, each rib having portions seating the base and first flanges,
 pairs of the ribs being each interconnected by a web including a slot and defining a curved surface cavity adjacent thereto,
 a seat formed on the spider in substantial axial alignment with each web and spaced from the web,
 a lug corresponding to each web seating on each seat and on the second flange,
 and retaining means interconnecting the corresponding lugs and webs to mount the rim on the spider, retaining means including
  a bolt attached to each lug and projecting axially between the interconnected rib pair through the slot,
  and a nut having a curved surface rockably mounted on the cavity curved surface for adjustable positioning to engage the bolt.

References Cited

UNITED STATES PATENTS

| | | | |
|---|---|---|---|
| 1,698,534 | 1/1929 | Broxon. | |
| 1,761,928 | 6/1930 | Main | 301—6 |
| 2,135,481 | 11/1938 | Brink | 301—6 |
| 2,927,822 | 3/1960 | Rabe | 301—6 |
| 3,043,631 | 7/1962 | Swoboda | 301—6 |

RICHARD J. JOHNSON, *Primary Examiner.*